United States Patent [19]

Chickering, III et al.

[11] Patent Number: 5,163,655
[45] Date of Patent: Nov. 17, 1992

[54] SPRING URGED SEAT ASSEMBLY FOR VALVES

[75] Inventors: Kenton Chickering, III, Simonton; Bela Vaczi, Houston, both of Tex.

[73] Assignee: Daniel Industries, Inc., Houston, Tex.

[21] Appl. No.: 862,780

[22] Filed: Apr. 2, 1992

[51] Int. Cl.⁵ .............................. F16K 5/22
[52] U.S. Cl. .................... 251/174; 251/337; 251/360
[58] Field of Search ............... 251/174, 360, 337

[56] References Cited

U.S. PATENT DOCUMENTS

| | | | |
|---|---|---|---|
| 2,882,009 | 4/1959 | Bryant | 251/174 X |
| 3,269,695 | 8/1966 | Grave | 251/174 |
| 3,401,915 | 9/1968 | Kim | 251/174 |
| 3,656,498 | 4/1972 | Grove et al. | 251/174 X |

Primary Examiner—John C. Fox
Attorney, Agent, or Firm—James L. Jackson

[57] ABSTRACT

A sealing assembly for valves incorporates an annular rigid seat member forming a reference face sealing surface and having a circular seal recess receiving a circular sealing member and a circular seal retainer member which project forwardly of said reference surface for sealing engagement with said working surface. The sealing element forms radially inner and outer stepped sealing surfaces which establish sealing engagement with the working surface of the valve element at various pressure conditions. The rigid seat element defines a cylindrical outer spring retainer recess which receives a plurality of compression springs for spring urged movement of the seat assembly toward the working surface of the valve element. A spring retainer and positioner element formed of a thin strip of sheet material defines spaced spring receptacles separated by spacer segments. The spring retainer and positioner positions the compression springs in substantially equally spaced relation about the spring retainer recess and secure them against inadvertent movement. One or more locking clips secure at least one of the positioner segments in intimate locked relation with the cylindrical surface of the spring retainer recess.

21 Claims, 4 Drawing Sheets

SPRING URGED SEAT ASSEMBLY FOR VALVES

FIELD OF THE INVENTION

This invention relates generally to valve mechanisms of the gate, ball or plug types which incorporate spring urged seat assemblies for establishing seals between the valve body and valve element. More specifically, this invention is directed to spring urged seat assemblies for valves incorporating face seal assemblies that resist pressure induced erosion or extrusion of resilient sealing materials of the seat assemblies especially during high pressure service conditions and which incorporate means for insuring proper location and function of seat springs.

BACKGROUND OF THE INVENTION

In the past, many valves of the gate, ball or plug types have employed sealing assemblies having seal rings composed of non-metallic resilient materials such as Nylon, Teflon, Kel-F, various elastomers and natural or synthetic rubber. Reference is made to U.S. Pat. Nos. 3,269,695 and 3,746,303. The latter patent discloses a valve mechanism having a sealing assembly with one part made of material such as Nylon and a second part made of a more resilient material such as synthetic rubber. The two parts are press fitted into an annular recess and provide finished sealing surfaces for engaging the valve working surface of a gate or other valve member. In one embodiment, the more resilient material is disposed adjacent one peripheral surface of the Nylon. In another embodiment, the more resilient material is disposed adjacent both the inner and outer peripheries of the Nylon.

Although the seat assemblies of the character set forth in the above identified patents have met with considerable success, in high pressure service conditions, they tend to be subject to pressure-induced seal erosion and are also subject to damage by pressure induced extrusion which tends to displace yieldable sealing material of the seat assemblies from their respective seal grooves to the extent that they can be damaged as the valve element is being moved between its open and closed positions. It is desirable, therefore, to provide a resilient face sealing assembly for the seat rings of valves which provides better seal adhesion than is normally available to thus provide more adequate retention of the sealing elements within the seal grooves, to resist pressure induced extrusion and erosion of the sealing members and to provide effective resistance to pressure induced seal blowout.

Many valve mechanisms are provided with seat assemblies having one or more springs that function to mechanically urge the seat assemblies toward sealing engagement with the working surface of the valve element. Typically, the seat rings are machined to provide multiple spring pockets with compression springs being located within the seat pockets to ensure that the springs are retained in evenly spaced relation about the periphery of the seat assembly. When the seat rings are disposed within their respective seat pockets within the valve body, the compression springs react against a spring stop surface or surfaces within the valve body and thus urge the seat ring into sealing engagement with the valve element. The formation of multiple spring pockets in a seat ring is an expensive manufacturing process and thus adversely affects the commercial feasibility of the resulting valve product. It is desirable, therefore, to provide means for adequate retention of multiple compression springs in appropriately retained, evenly spaced and guided relation with a seat ring while at the same time minimizing the manufacturing costs of the seat ring to thus enhance the commercial viability of the resulting valve mechanism.

SUMMARY OF THE INVENTION

This invention relates generally to valves for controlling fluid flow especially valves for use in high pressure conditions and methods for the manufacture of the seats or seals.

In general it is an object of the present invention to provide a novel valve mechanism having a sealing assembly which includes two different types of non-metallic resilient material such as Nylon and a relatively low durometer sealing material including a relatively high durometer material such as synthetic rubber. These sealing materials are arranged in combination to provide a sealing assembly for valve seats which effectively resists pressure induced extrusion, pressure erosion and seal blowout.

It is another feature of the present invention to provide a novel seat assembly for valve mechanisms wherein the seat ring defines internal concentric grooves such that differing seal materials are independently and cooperatively retained such that they are mechanically interlocked with one another and with the structure of the seat ring to thus provide a sealing assembly of enhanced structural integrity.

It is another feature of this invention to provide a novel seat assembly for valve mechanisms wherein the seat ring forms a concentric internal groove or recess which cooperates with the seal assembly to provide for better adhesion of the seal assembly within the seal groove especially during high pressure conditions to resist seal extrusion and seal blowout.

It is an event further feature of this invention to provide a novel spring urged seat assembly for valve mechanisms which incorporates a plurality of compression springs and is provided with a simplified spring positioner and retainer assembly that minimizes the cost of seat manufacture without detracting from the operational efficiency of the seat assembly.

Briefly, the invention is incorporated in a valve such as a gate, ball, plug valve, etc. which includes a body having aligned flow passages and a valve member within the body movable between open and closed positions. The seat assemblies each consist of a rigid, annular seat member carried by the body and sealed with respect to the same. The sealing face portion of the seat member (that portion near the valve member) is formed with an annular seal recess which accommodates an annular seal ring which is composed of any one of a number of suitable sealing materials such as Nylon, Teflon, Kel-F or various elastomers such as natural or synthetic rubber. The seal assembly also incorporates an annular seal retainer element which is also formed of sealing material of differing hardness as compared to the hardness or durometer of the sealing member. The seal retainer establishes a locking and retaining interrelation with the inner periphery of the sealing member and with an inner peripheral portion of the seat ring such that the sealing assembly, including the sealing ring and the seal retainer ring, are retained as a seal assembly within the seal recess of the seat ring in such manner as to effectively resist pressure extrusion, erosion and seal blowout.

The invention also incorporates a plurality of seat springs which are positioned by a spring positioner and retainer element within a cylindrical spring recess formed at the peripheral portion of the seat member. The spring positioner and retainer is secured in position by at least one and preferably several locking clips.

Additional objects and features of the invention will appear from the following description in which the preferred embodiment has been set forth in detail in conjunction with the accompanying drawings.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

DESCRIPTION OF THE PREFERRED EMBODIMENTS

Figure 1:
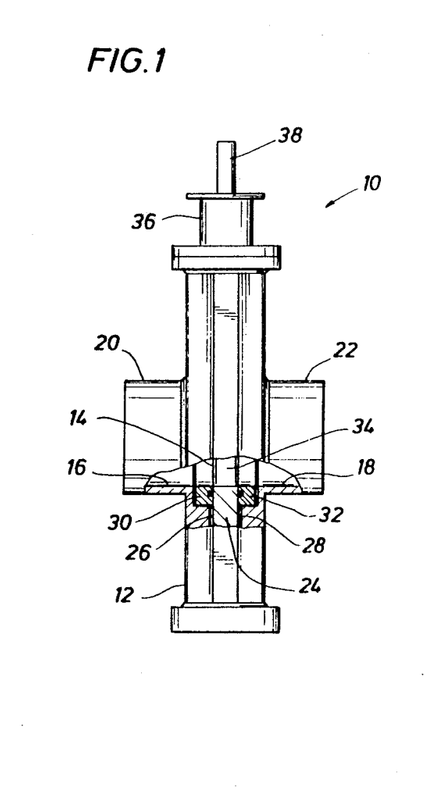
FIG. 1 is a side elevational view, partly in section, illustrating a gate valve incorporating a seat assembly representing one embodiment of this invention.

Referring now to the drawings and first to FIG. 1, the gate valve mechanism illustrated generally at 10 consists of a body structure 12 forming a valve chamber 14 and having aligned flow passages 16 and 18 disposed in intersecting relation with the valve chamber and adapted to conduct the flow of fluid through the valve mechanism. The flow passages 16 and 18 are formed by aligned hubs 20 and 22 which are disposed for connection by welding, bolting or by any other suitable means of connection, with adjacent piping to which the valve is to be assembled. Within the valve body is disposed a gate member 24 which is typically formed of flat plate material and defines parallel planar working surfaces 26 and 28 which are engaged by seat assemblies 30 and 32 for establishment of a fluid-tight seal between the gate and the valve body structure. The gate member 24 typically forms a port 34 through which fluid flows when the valve mechanism is in its open position with the port 34 disposed in registry with the flow passages 16 and 18. The valve mechanism 10 also includes a bonnet assembly 36 having a packing gland disposed therein which establishes a seal between the valve body and a gate operating stem 38 that extends upwardly from the gate member 24. Any suitable valve actuator may be connected to the bonnet assembly 36 for imparting vertical movement to the valve stem 38 for movement of the gate member between its open and closed positions.

Figure 2:
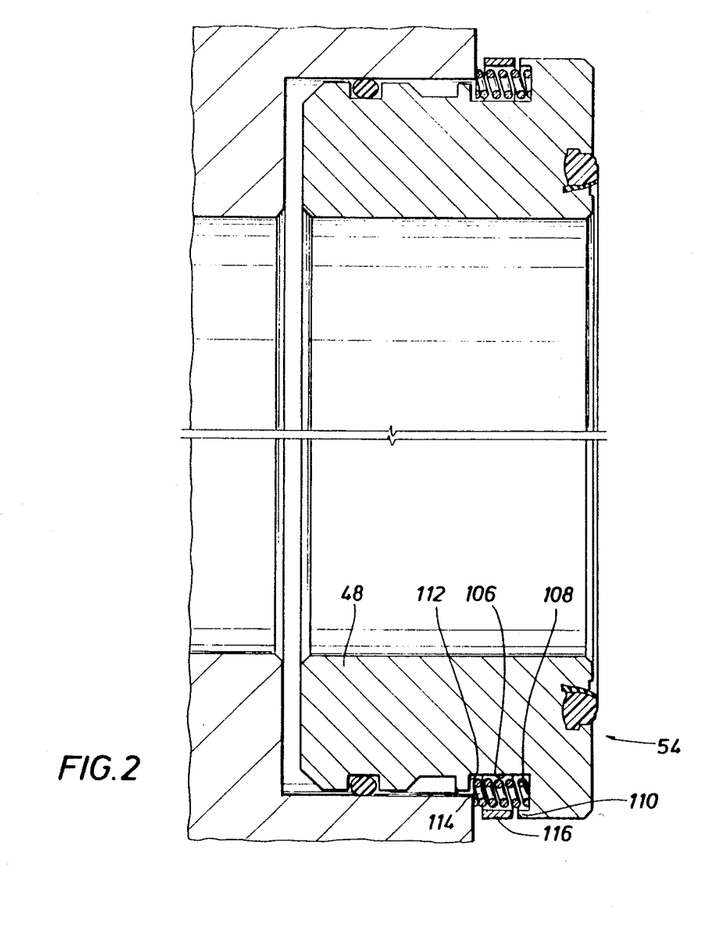
FIG. 2 is an enlarged fragmentary sectional view of the valve mechanism of FIG. 1, illustrating a single seat assembly and its relationship to the valve body and to the gate member of the valve.

The fragmentary sectional view of FIG. 2 illustrates one of the seat assemblies of the valve mechanism of FIG. 1 and discloses the manner by which the seat assemblies are carried by the valve body. As illustrated in FIG. 2, the valve body structure 12 forms intersecting cylindrical and circular surfaces 40 and 42 which cooperate to define a circular seat recess 44 which receives the seat assembly generally shown at 46 in movable relation therein. The seat assembly is defined by a circular seat body or ring 48 having an outer peripheral seal groove 50 formed therein and receiving a circular resilient sealing element 52 that establishes sealing engagement with the cylindrical outer peripheral surface of the seat recess 44.

The seat assembly defines a sealing face shown generally at 54 incorporating metal and elastomeric sealing means for establishment of sealing engagement with one of the working surfaces 56 of the gate member 24. The sealing means 54 forms an important aspect of the present invention and will be discussed in detail hereinbelow.

The seat assembly also incorporates a spring energizing feature illustrated generally at 58 and incorporating a plurality of compression springs which urge the seat assembly into sealing engagement with the valve element. The seat assembly further includes means for efficiently positioning the compression springs in substantially equally spaced relation about the outer periphery of the seat body. The spring spacer and positioner and its locking element is also an important aspect of the present invention and will be described in detail hereinbelow.

Figure 3:
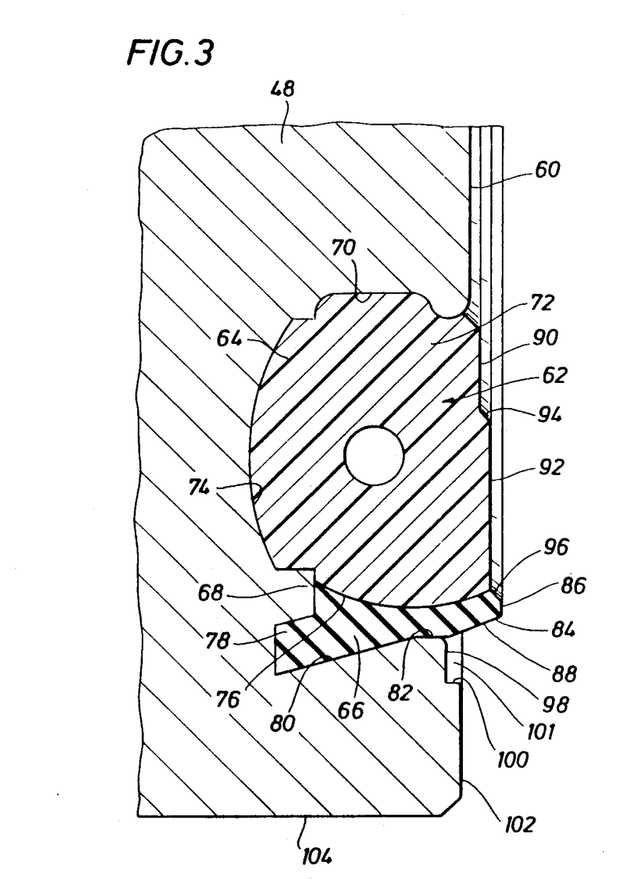
FIG. 3 is an enlarged fragmentary sectional view of the valve seat structure of FIG. 2 illustrating the structural relationships of the sealing member and seal retainer member to the seat structure.

With reference now to FIG. 3, the sealing face assembly 54 includes an outer peripheral, planar sealing face surface 60 which establishes a reference surface. The sealing face surface 60 will establish metal-to-metal sealing engagement with the working surface 56 of the gate member under extremely high pressure conditions when the resilient sealing member of the sealing face assembly will have been displaced to its maximum extent by the force of high pressure typically acting on the valve element and forcing it against the downstream seat. The face portion of the seat body 48 is machined to form a circular seal recess illustrated generally at 62 which is located at the inner periphery of the circular reference surface 60 of the sealing face and which incorporates a seal groove 64 forming the inner peripheral portion of the seal recess and a seal retainer groove 66 forming the radially inner portion of the seat recess. The seat body defines an internal circular retainer ridge 68 within the seat recess which forms a partition for the inner portion of the seat recess so that the inner retainer groove 66 is defined. Within the seal groove 64 the seat body structure 48 is machined to form a circular outer peripheral undercut area 70 which provides an interlocking feature for mechanical retention of the outer peripheral portion of a circular resilient sealing element 72.

The sealing element 72 may be composed of any one of a number of suitable polymer sealing materials such as Nylon, Teflon, Kel-F, etc. having efficient structural integrity for the intended service and also providing for efficient sealing capability at virtually all pressure ranges to which the valve will be subjected. The sealing element 72 may also be composed of any one of a number of elastomeric sealing materials such as synthetic or natural rubber having a durometer sufficient for resistance of seal displacement at the particular pressure range for which the valve mechanism is designed.

The bottom or inner surface 74 of the circular seal groove surface 64 is of arcuate cross-sectional configuration and receives the inner portion of the sealing element 72 in intimately fitting engagement therewith. The radially inner portion of the sealing element 72 also defines an arcuate surface 76 which is disposed in intimately interfitting relation with a circular seal retainer element 78 and cooperates with the seal retainer to insure that the seal ring is secured at its fully seated position within the seal retainer groove 66. The seal retainer may be composed of any one of a number of sealing materials, including various polymer materials and various elastomer materials that are suitable for the service that is intended. For example, the seal retainer may be composed of natural or synthetic rubber, or it may be composed of suitable polymers such as Nylon, Teflon, Kel-F, etc.

The seal retainer groove 66 is typically formed by projecting a cutting tool into the seal recess such that the cutting tool forms a tapered inner surface 80 which is disposed in intersecting relation with a cylindrical surface 82. These intersecting surfaces cooperate with the curved inner peripheral surface 76 of the sealing element 72 to form a restriction between the seal ring and the inner peripheral surface 82 of the seat recess that insures against pressure induced displacement of the seal retainer 78 from its retainer groove 66. A forward portion 84 of the seal retainer element projects from the retainer groove 66 and extends along the inner peripheral surface of the sealing element 72. This forwardly extending portion of the retainer element projects slightly beyond the forward portion of the sealing element 72 such that initial contact of the sealing assembly with the working surface of the gate or other valve member occurs at an inner peripheral sealing rim 86 which forms the inner periphery of the seal that is ultimately established between the seat ring and valve element. The forwardly projecting portion 84 of the retainer element is also formed to define a tapered outer peripheral surface 88 which is inclined in the range of from about 10° to about 30° from the cylindrical surface 82, thus minimizing the cross-sectional dimension of the forwardly projecting portion 84 of the seal retainer element and forming a seal retainer configuration that resists pressure induced blow-out.

The sealing element 72 and the seal retainer element therefore cooperate to provide for better adhesion of the sealing assembly to the seat body and resist pressure induced blowout of the seal and seal retainer. These features are efficiently accomplished by forming the sealing element such that steps are formed in the face portions thereof and to locate the seal retainer such that it defines a step in relation to the inner step of the sealing element. The stepped sealing faces of the seal ring 72 and the seal retainer 66 are typically formed by a machining operation after the seal ring and seal retainer have been press fitted within the seat recess 72.

As shown in detail in FIG. 3, a radially outer sealing face surface 90 of the sealing element 72 is located in forwardly spaced relation with respect to the plane of the sealing face reference surface 60. For example, in one gate valve application of the present invention, the planar sealing surface 90 is located 0.005 inches forwardly of the reference surface 60. The sealing element 72 further defines an outer peripheral planar sealing surface 92 which, in one gate valve application is located in parallel relation with sealing face surfaces 60 and 90 and is located in the range of 0.005 inches forwardly of the sealing surface 90. The stepped sealing surfaces 90 and 92 are interconnected by a tapered surface 94 which is located intermediate the inner and outer peripheral portions of the sealing face of the sealing element. The surface 94, in the valve application mentioned above, has a taper in the range of about 30° in relation to the plane of the outer peripheral sealing surface 92. It should also be born in mind that the seal retainer element 78 defines a circular sealing rim 86 which is projected forwardly in relation to the plane formed by the outer peripheral sealing surface 92 of the sealing element. The sealing rim 86 in the valve application mentioned above, extends approximately 0.005 inches forwardly of the plane of the sealing surface 92. The sealing rim may also form a tapered surface portion 96 which intersects the planar surfaces 86 and 92.

Radially inwardly of the seal retainer element 78 the seat body 48 is formed to define a planar surface 98 and a cylindrical surface 100 which cooperate to form a circular groove or recess 101 which is located immediately radially inwardly of the forward portion of the seal retainer and into which material of the sealing element 72 and seal retainer 78 may be displaced by the pressure induced mechanical force between the valve element and seat assembly during high pressure conditions. As the seal and retainer are displaced by force between the seat ring and the valve element, the displaced material is received in protected relation by the circular groove 101. Since the seal and retainer material is not extruded between contacting surfaces of the seat ring and valve element, the materials is protected against excessive erosion, abrasion or cutting. The seat assembly is therefore effective at very high pressures.

The seat ring 48 forms a relieved inner peripheral surface 102 which is intersected by the cylindrical surface 98 and which extends to the inner periphery 104 of the seat body. The relieved surface 102 in the case of the example described above is in the form of a planar surface which is located rearwardly of the reference sealing face 60. Thus, when the sealing face 60 is disposed in metal-to-metal contact with the planar working surface of the gate member, the planar surface 102 will be disposed in spaced relation with the working surface of the valve element. In the example described above, the surface 102 is relieved in the range of 0.010 inches rearwardly of the plane established by the reference sealing face 60.

Figure 4:
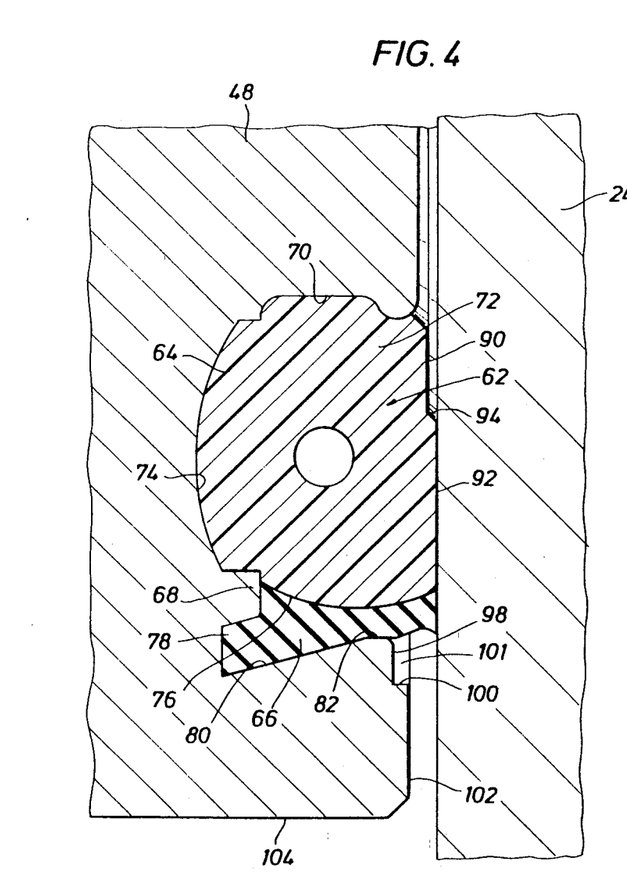
FIG. 4 is a fragmentary sectional view similar to that of FIG. 1 and further illustrating the relationship of the components of the seat assembly and valve gate member during zero or low pressure conditions.
Figure 5:
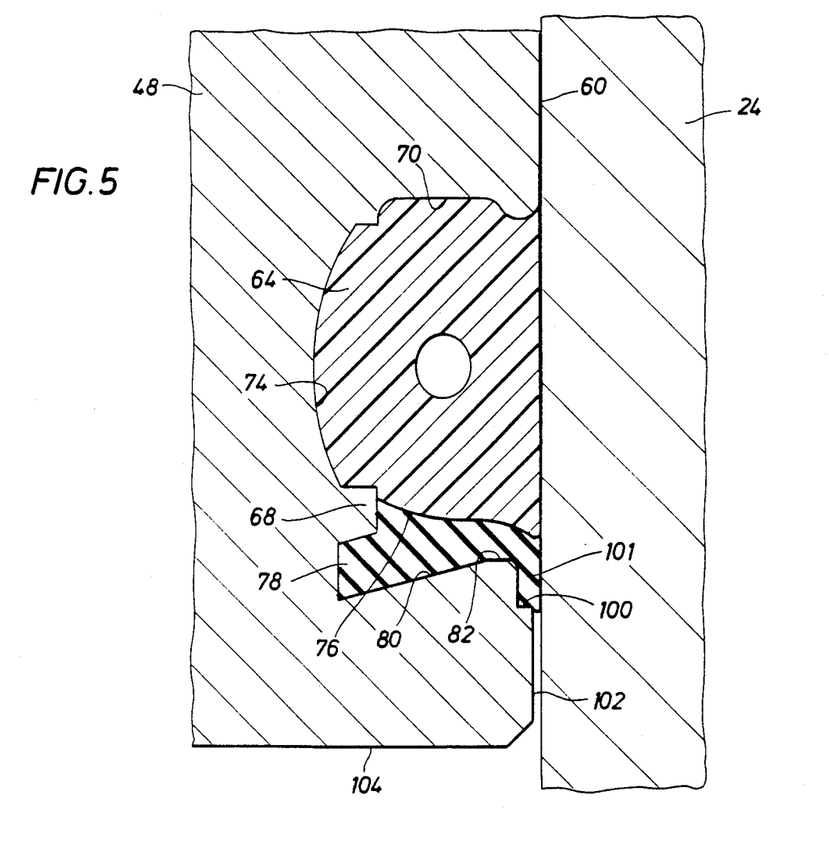
FIG. 5 is a fragmentary sectional view similar to that of FIGS. 3 and 4 and illustrating the relationships of the components of the seat assembly under high pressure conditions.

With reference to FIG. 4, the relative positions of the seat assembly and gate are depicted as would occur during zero or low pressure conditions. In this case, the mechanical force established by the compression springs and urging the seat assembly toward the working surface of the gate member is sufficient to deform only the material of the circular sealing rim 86, thus causing the working surface of the gate to be in sealing engagement not only with the resilient material of the seal retainer element 78 but also in sealing engagement with the planar sealing surface 92 of the sealing element.

As mentioned above, each of the seat assemblies of the valve mechanism are urged toward respective working surfaces of the valve element by the force of a plurality of compression springs. In the past, the valve seat body of a typical valve was machined to form a plurality of equally spaced blind bores which open toward the rear face of the seat element and form spring pockets. When the seat assembly is positioned within its respective seat pocket, these springs contact a stop shoulder located internally of the valve body and thus permit the seat assembly to be urged forwardly toward the working surface of the valve element. It is well known the machining operations necessary to form multiple spring pockets is quite expensive. In order to minimize the expense of the machining operations for the seat assembly and to thus enhance the competitive nature of the resulting valve product, the present invention incorporates multiple compression springs as have been employed in the past but provides for efficiently and simply positioning the springs in equally spaced relation about a cylindrical spring retainer groove. As is evident from FIG. 2, the seat body or ring 48 is machined to form a circular spring retainer groove 106 at the outer peripheral portion of the seat ring. The cylindrical groove 106 extends forwardly and forms a cylindrical undercut end 108 which forms a rearwardly projecting circular spring retainer rim 110. At its forward end the spring recess defines a circular stop shoulder 112 having an outer diameter less than that of the spring retainer rim 110.

A plurality of compression springs 114 are located within the spring recess with the respective ends thereof interposed between surfaces 108 and 112 such that the springs are linearly confined. It is desirable to insure equally spaced positioning of the springs 114 about the cylindrical surface 106 so that the seat assembly is urged forwardly with equally distributed force toward the working surface of the valve element. According to one of the important principles of the present invention, a spring retainer and positioner element 116 of generally circular form is located about the cylindrical surface 106 forming the spring retainer groove.

Figures 6, 7:
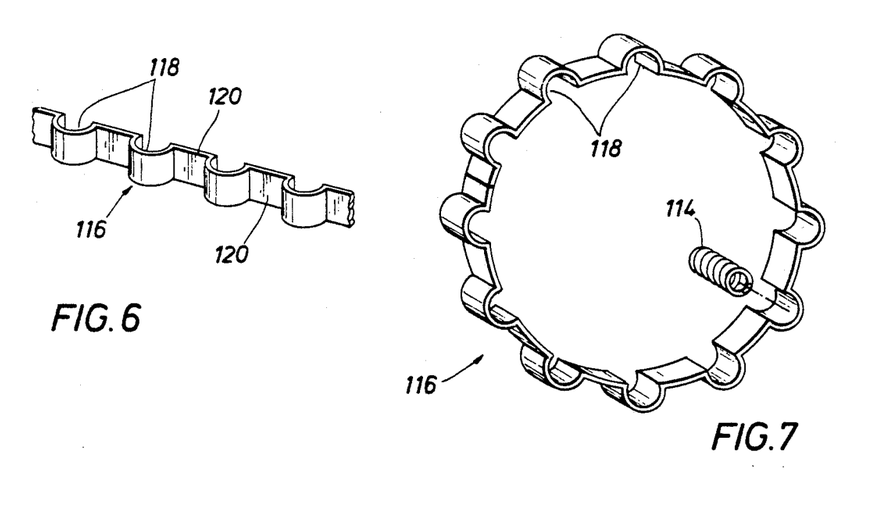
FIG. 6 is an isometric illustration of a strip of spring spacer material such as is employed to form a circular spring spacer of he seat assembly.
FIG. 7 is an isometric illustration of a spring spacer formed from the strip material of FIG. 6.

As shown in detail in FIGS. 6 and 7 the seat retainer element 116 is typically formed of an elongate strip of sheet material, typically a metal such as stainless steel, although it may be formed of any other suitable material appropriate for the service conditions for which the valve mechanism is designed. The spring retainer and positioner element forms a plurality of spring positioner receptacles 118 which are equally spaced along the length thereof. Each of the receptacles 118 is formed by a section of the strip material having an arcuate configuration defining a portion of a circle having a diameter slightly larger than the external diameter of the compression spring. Between each spring receptacle 18 is located a retainer section 120 having a configuration closely approximating the configuration of the cylindrical surface 106 such that each of the segments 120 of the spring retainer will be positioned in substantial contact or in closely spaced relation with the cylindrical surface 106. When so positioned, each of the compression springs will be located in touching or in juxtaposed relation with the cylindrical surface 106 and will be positioned and guided by the respective inner arcuate surface of the spring receptacle 118 within which it is retained.

In the manufacture of the spring retainer 116 a length of strip material, formed such as shown in FIG. 6, is cut to appropriate length and then formed to define the circular spring retainer of FIG. 7 such that the respective ends of the spring retainer strip are brought into contacting or overlapping engagement or are fixed to one another such as by spot welding riveting or by other suitable means. Alternatively, the spring spacer and retainer device 116 may be composed of a material having a spring like characteristic such that it may be deformed for placement about the cylindrical surface 106 and it will return to its normal circular configuration even though the respective ends are not maintained in fixed assembly. The use of the spring positioner and spacer 116 therefore permits the cylindrical groove formed by the surfaces 106, 108 and 112 to be formed by a single rotational machining operation thus eliminating the necessity for drilling multiple blind bores for spring retention. This feature effectively minimizes the overall cost of the seat assembly and thus materially enhances the competitive nature of the resulting valve product. Through use of the spring retainer and spacer, each of the compression springs is properly positioned at all times such that balanced force is applied collectively by the springs to all portions of the seat assembly. This feature insures that the seat assembly is urged toward the working surface 56 of the gate member in a manner that maintains the face portion of the seat assembly in precisely parallel relation with the working surface during any seat movement that occurs as the gate or other valve member is shifted by changes in pressure.

Figure 8:
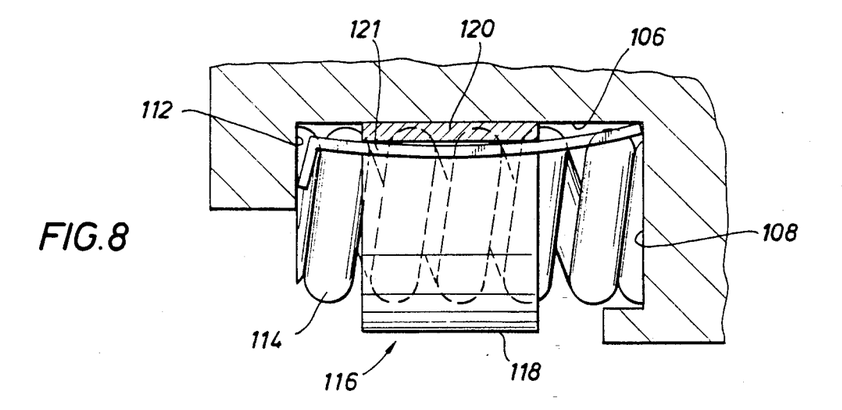
FIG. 8 is a fragmentary sectional view of the seat assembly of FIG. 2 illustrating a spring spacer retainer in position to secure the spring spacer and positioner in locked relationship with the seat assembly.

Referring now to FIG. 8 the spring retainer and positioner 116 set forth in FIGS. 6 and 7 is secured within the spring retainer groove 106 by means of a locking clip member 121 having an elongated curved portion which extends over one of the retainer sections 120 of the spring positioner and spacer 116 to thus position the retainer section 120 in a relation of engaging or close proximity to the cylindrical surface 106. The spring positioner and spacer may be secured in position about the cylindrical surface 106 by one or several locking clips 121 thus ensuring that the springs 114 and the spring retainer and positioner 116 remain properly positioned during operation of the valve mechanism.

Figure 9:
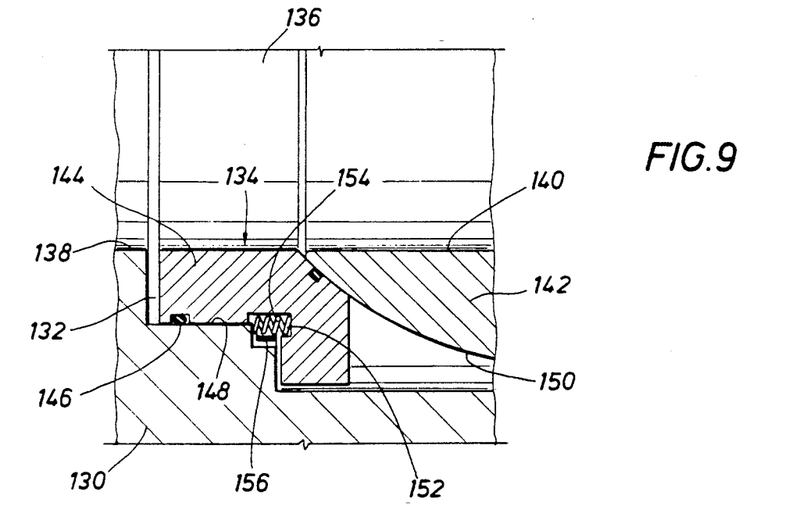
FIG. 9 is a fragmentary sectional view of a ball valve mechanism incorporating a seat assembly representing an alternative embodiment of this invention.
Figure 10:
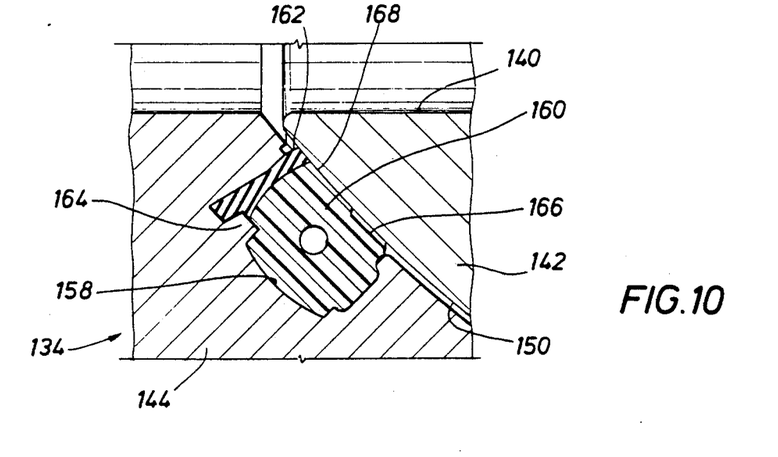
FIG. 10 is a partial sectional view of the ball valve mechanism of FIG. 9 illustrating the relationship of the seat assembly to the valve body structure and to the valve ball element.

Referring now to FIGS. 9 and 10, an alternative embodiment of the present invention is illustrated in the form of a spring energized seat assembly for a ball valve. As shown in FIG. 9, the fragmentary sectional view illustrates a body structure 130 which is formed to define an internal annular seat recess 132 within which is located a seat assembly shown generally at 134 which is of generally circular form and defines a central opening 136 which is disposed in registry with the flow passage 138 of the valve body and which is adapted for registry with the flow port 140 of a valve ball 142 in the open position of the valve. The seat assembly 134 basically incorporates a rigid annular seat body or ring 144 which is sealed with respect to the valve body 130 by means of an annular sealing element 146 which is retained within an annular seal groove formed in the seat ring and establishes sealing engagement with a cylindrical surface 148 of the seat recess 142.

The seat assembly 134 is urged in a direction toward the working surface 150 of the valve ball element 142 by means of a plurality of compression springs 152 which are retained within a cylindrical spring recess 154 by means of a spring spacer and positioner 156. The spring spacer and positioner is secured with respect to the spring recess by means of one or more spring clips such as that shown at 121 of FIG. 8. The spring recess, compression springs and spring spacer may conveniently take the form illustrated in FIGS. 2, 6 and 7. Accordingly, the discussion set forth above in relation to FIGS. 2, 6 and 7 as regards the compression spring, spring recess, spring spacer and locking clips are equally applicable to the seat assembly 134 of FIG. 9.

Referring now to FIG. 10, the seat assembly 134 is provided with a sealing assembly having a similar construction and function as compared with the sealing assembly of FIG. 3. The seat ring 144 is formed to define a circular seal recess 158 within which is located a sealing assembly comprising a stepped circular sealing element 160 and a seal retainer element 162. The seat ring 144 forms a circular internal retainer ridge 164 which separates the inner portion of the seal recess into a circular seal groove and a circular seal retainer groove. The seal retainer groove is located adjacent the inner peripheral portion of the seal groove and thus provides for location of the seal retainer element 162 in supporting and retaining relation with the inner peripheral portion of the circular seal member 160. The construction of the sealing assembly, including inner and outer stepped sealing surfaces 166 and 168 and the relationship of the seal retainer element 162, are of the general character, form and function as described above in connection with FIG. 3. Accordingly, the discussion set forth above in connection with FIG. 3 and the claimed subject matter hereof are equally applicable to ball valves as shown in FIGS. 9 and 10 and to other types of valves as well.

The seat assembly, including the seat ring with its sealing element and seal retainer element are typically manufactured as follows: After the seat ring has been machined to form the reference surface 60 the circular recess 101, the planar relieved surface 102 and the seat recess 62 lengths of polymer sealing material and resilient sealing material are formed to a circle and forced into the seat recess under pressure. The polymer sealing material is initially of circular cross-sectional configuration with a central passage formed along the length thereof. The elastomer sealing material is in the form of a strip which is positioned within the seal retainer groove. The polymer sealing element is forced into the seat recess 62 under sufficient mechanical pressure as to deform it essentially to the configuration of the seat recess. This seal deforming activity develops a mechanically interlocked relation between the sealing element and the seat ring and securely locks the seal retainer element within its groove. Thereafter, the face of the sealing element is machined to form the planar surfaces 90 and 92 and the intermediate tapered surface 94. The forwardly projecting rim of the seat retainer element is also formed by this face machining operation, after which any sharp edges are removed by sanding so that a smooth contour is developed at the intersecting surfaces thereof. The then finished seat assembly is placed in the seat pocket of the valve and is retained in spaced relation by compressing the seat springs while the valve element is positioned between the opposed seat assemblies between the opposed seat assemblies. The seats are then released, thus allowing the compression springs to urge the seats into engaging relation with the working surface of the valve element.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. In a sealing assembly for a valve having a valve body forming a valve chamber therein and having a valve element disposed for movement between open and closed positions within said valve chamber and having at least one working surface, the improvement comprising:
    (a) an annular rigid seat member interposed between said working surface of said valve element and said valve body, said seat member forming a sealing face directed toward said working surface and forming a reference surface, said seat member defining an annular seal recess disposed radially inwardly of said reference surface said seal recess being defined in part by an outer peripheral undercut surface and in part by an internal concentric ridge separating the inner portion of said seal recess into a seal groove and a seal retainer groove;
    (b) a circular sealing element composed of resilient sealing material substantially filling said seal groove, said circular sealing element forming an outer peripheral portion substantially conforming to said outer peripheral undercut surface, said circular sealing element forming a sealing face having inner and outer concentric annular steps, the inner concentric annular step projecting forwardly of said outer concentric annular step for sealing contact with said working surface;
    (c) a circular seal retainer composed of resilient sealing material and having an inner portion located radially inwardly of said internal concentric ridge and substantially filling said seal retainer groove, said circular seal retainer having interlocking relation with said circular sealing element and forming a circular sealing rim projecting forwardly of said inner annular step of said circular sealing element and disposed for sealing contact with said working surface; and
    (d) means urging said sealing assembly toward said working surface.

2. The sealing assembly of claim 1, wherein:

(a) said circular sealing element forms an internal peripheral surface having a curved cross-sectional configuration which forms a seal retainer groove restriction with said rigid seat member; and (b) said circular seal retainer having a portion extending through said seal retainer groove restriction such that said circular seal retainer is interlocked between said circular sealing element and said annular rigid seat member.

3. The sealing assembly of claim 2, wherein:

said circular seal retainer forms a tapered forwardly projecting portion extending from said rigid seat member to said circular sealing rim.

4. The sealing assembly of claim 1, wherein:

said annular rigid seat member forms a circular recess disposed radially inwardly of said circular seal retainer and providing for displacement of sealing material therein when said circular sealing element and said circular seal retainer are deformed by pressure induced mechanical force.

5. The sealing assembly of claim 4, wherein:

said annular rigid seat member forms a circular relief surface located radially inwardly of said circular seal retainer forwardly of said circular recess and rearwardly of said reference surface.

6. The sealing assembly of claim 1, wherein:

said annular rigid seat member forms a circular surface having a curved cross-sectional configuration and forming the inner surface of said seal groove.

7. The sealing assembly of claim 1, wherein:

(a) said annular rigid seat member forms a cylindrical spring recess at the outer peripheral portion thereof;

(b) a plurality of compression springs are located within said cylindrical spring recess such that one of the ends thereof is disposed for engagement with a stop surface of said valve body; and (c) a spring retainer and spacer element positioned about said cylindrical spring recess and forming a plurality of spring receptacles each receiving and positioning one of said compression springs in substantially equally spaced relation about said cylindrical spring recess.

8. The sealing assembly of claim 7, wherein:

said spring retainer and spacer element is formed of strip material having substantially equally spaced segments thereof disposed between said spring receptacles and being disposed for positioning engagement with a cylindrical surface forming a part of said cylindrical spring recess.

9. The sealing assembly of claim 7, including:

at least one locking element securing said spring retainer and spacer element within said cylindrical spring recess.

10. The sealing assembly of claim 9, wherein said locking element comprises:

an elongate locking clip having a configuration cooperating with said cylindrical surface of said cylindrical spring recess to form a circular space, said elongate locking clip securing a respective segment of said spring retainer and spacer in intimate relation with said cylindrical surface.

11. In a sealing assembly for a valve having a valve body forming a valve chamber therein and having a valve element disposed for movement between open and closed positions within said valve chamber and having at least one working surface, the improvement comprising:

(a) an annular rigid seat member for establishing a seal between said working surface of said valve element and said valve body, said seat member forming a circular sealing face disposed opposite said working surface and forming a circular seal recess intersecting said sealing face;

(b) a circular sealing element composed of resilient sealing material and being disposed within said seal recess, said circular sealing element forming a sealing surface having radially inner and outer concentric annular steps, the radially inner concentric step projecting forwardly of said outer concentric step for sealing contact with said working surface and said radially outer annular step projecting forwardly of said sealing face of said annular rigid seat member; and (c) a circular seal retainer element composed of resilient sealing material and being disposed within said circular seal recess and being in locking and sealing engagement with the inner periphery of said circular sealing element an securely locking said circular sealing element within said circular seal recess.

12. The sealing assembly of claim 11, wherein:

said circular sealing element forms a circular tapered surface intersecting said radially inner and outer concentric annular sealing steps.

13. The sealing assembly of claim 11, wherein:

said circular seal retainer element forms an annular sealing rim projecting forwardly of said inner sealing step of said sealing element and being disposed for sealing contact with said working surface.

14. The sealing assembly of claim 11, wherein:

said annular rigid seat member forms a relief groove disposed radially inwardly of said circular seal retainer element for receiving displaced sealing material upon pressure induced deformation of said circular sealing element and said circular seal retainer element.

15. The sealing assembly of claim 11, wherein:

(a) said annular rigid seat member defines a circular internal retainer ridge partitioning the inner portion of said circular seal recess and forming a circular seal groove and a circular seal retainer groove disposed radially inwardly of said circular internal retainer ridge; and (b) said circular seal retainer element being received within said circular seal retainer groove and locking said circular sealing element within said circular seal groove.

16. The sealing assembly of claim 15, wherein:

said circular seal retainer element projects forwardly of said circular sealing element and defines a circular sealing rim thereabout, said circular retainer element further forming a circular tapered radially inner surface portion of said circular sealing rims.

17. The sealing assembly of claim 11, wherein:

(a) said sealing face of said annular rigid member defines a reference surface disposed for sealing engagement with said working surface under high pressure conditions;

(b) said radially inner and outer sealing steps of said sealing element project forwardly of said reference surface; and (c) said annular rigid seat member forms circular surface means disposed radially inwardly of said circular seal recess and being located rearwardly of said reference surface.

18. The sealing assembly of claim 11, including:

(a) said annular rigid seat member forms a substantially cylindrical spring recess at the outer peripheral portion of said rigid seat member, said cylindrical spring recess being formed in part by a cylindrical surface;

(b) a plurality of compression springs being located within said seat recess such that one of the ends thereof is disposed for engagement with a stop surface of said valve body; and (c) a spring retainer and positioner element positioned about said cylindrical seat recess and forming a plurality of substantially evenly spaced spring receptacles each receiving and positioning one of said compression springs in substantially equally spaced relation about said cylindrical spring recess.

19. The sealing assembly of claim 18, wherein:

said spring retainer element is formed of strip material having substantially equally spaced segments thereof disposed between said spring receptacles and being disposed for positioning engagement with said cylindrical surface.

20. The sealing assembly of claim 19, including:

at least one locking element securing said spring retainer and spacer element within said cylindrical spring recess.

21. The sealing assembly of claim 20, wherein said locking element comprises:

an elongate locking clip having a configuration cooperating with said cylindrical surface of said cylindrical spring recess to form a circular space, said elongate locking clip securing a respective segment of said spring retainer and spacer in intimate relation with said cylindrical surface.

* * * * *